United States Patent (10) Patent No.: US 7,740,195 B1
Daniels (45) Date of Patent: Jun. 22, 2010

(54) SPRINKLER ASSEMBLY

(76) Inventor: Grant Daniels, P.O. Box 400, Bismarck, ND (US) 58502-0400

( * ) Notice: Subject to any disclaimer, the term of this patent is extended or adjusted under 35 U.S.C. 154(b) by 358 days.

(21) Appl. No.: 12/073,587

(22) Filed: Mar. 7, 2008

(51) Int. Cl.
*A01G 25/06* (2006.01)
*B05B 15/06* (2006.01)
*B05B 3/00* (2006.01)
*A62C 31/24* (2006.01)
*B05B 3/18* (2006.01)

(52) U.S. Cl. .................... 239/741; 239/200; 239/225.1; 239/279; 239/280; 239/723; 239/726; 239/742

(58) Field of Classification Search ................. 239/140, 239/200, 210, 225.1, 263, 264, 275, 276, 239/279, 280, 280.5, 587.1, 600, 723, 741, 239/742, 743, 744, 726, 732
See application file for complete search history.

(56) References Cited

U.S. PATENT DOCUMENTS 3,807,635 A * 4/1974 Platt ........................... 239/726
5,447,274 A * 9/1995 Tofin et al. .................. 239/724

* cited by examiner

*Primary Examiner*—Dinh Q Nguyen
*Assistant Examiner*—Ryan Reis

(57) ABSTRACT

A wheeled lawn sprinkler assembly for easily moving a lawn sprinkler around a large or small size yard which assembly contains a shut off valve, a collapsible wheel assembly and a collapsible support assembly.

14 Claims, 7 Drawing Sheets

SPRINKLER ASSEMBLY

BACKGROUND OF THE INVENTION

1. Field of the Invention

A lawn sprinkler assembly and more particularly a wheeled support lawn sprinkler assembly for easily moving a lawn sprinkler around a large or small size yard which assembly contains a shut off valve, a collapsible wheel assembly and a collapsible support rod.

2. Description of Related Art

Proper irrigation of a lawn, garden or turf is a time consuming task requiring the constant movement of hoses and attached sprinklers. Each time the sprinkler is to be moved, the water line must be shut off at the shut off location, usually the house, the hose moved and then the water turned back on. This identical process may be undertaken several times a day depending upon the size of the area to be watered. While home owners desire a green lawn, the constant need to turn on and off the water supply and drag the hoses and sprinklers can become overwhelming and can, in certain circumstances, result in physical injury.

Water sprinkler systems of various designs, structure, configurations and materials of construction have been disclosed in the prior art. For example, U.S. Pat. No. 1,959,886 to Wadsworth discloses a portable sprinkler support that has a tripod supporting ring having non-extendable bamboo legs for use in watering and spraying of fruit trees. The water is passed through a central non-extendable pipe and a sprinkler head. This prior art patent does not disclose the particular structure and design of the water sprinkler system of the present invention.

U.S. Pat. No. 2,694,600 to Richey discloses a lawn sprinkler stand having a C-shaped configuration base supported by a tripod collar having braces that are non-extendable and connected to the C-shaped base. The water is passed through a central extendable pipe and a sprinkler head. This prior art patent does not disclose the particular structure and design of the water sprinkler system of the present invention.

U.S. Pat. No. 4,824,020 to Harward discloses a sprinkler stand having a central support hub with a plurality of at least five non-extendable legs, and the water is passed through a short central pipe and a sprinkler head. This prior art patent does not disclose the particular structure and design of the water sprinkler system of the present invention.

U.S. Pat. No. 5,439,176 to Bussiere discloses a lawn-garden sprinkler having a tripod support structure. The tripod support structure includes a spindle axis having non-extendable support rods which radiate outwardly from the central axis being connected to tie rods. The tie rods are welded to the support rods to provide a rigid tripod construction resistant to fracture or bending forces. The water passes through a short angled pipe and a sprinkler head. This prior art patent does not disclose the particular structure and design of the water sprinkler system of the present invention.

None of the prior art water sprinkler systems disclose the structure, configuration and functionality of the present invention.

Accordingly, it is the primary object of the present invention to provide a sprinkler assembly which can be easily moved from place to place, can be easily and conveniently stored, and is inexpensive and non-corrosive.

A further objective of this invention is to provide a sprinkler assembly which is easy to use and inexpensive for the consuming public.

It is a further object of the present invention to provide a sprinkler assembly of simple design, durability and sturdiness.

It is the further object of the present invention to provide a sprinkler assembly containing a valve for stopping the water from continuing to the sprinkler, thereby eliminating the need for the water to be turned off at its source each time the sprinkler assembly is to be moved.

It is the further object of the present invention to allow a variety of sprinkler heads to be attached to the sprinkler assembly to properly accommodate the area to be watered.

It is the further object of the present invention to provide a sprinkler assembly that is of simple structural configuration for easy setup for water spraying of lawns, gardens, arenas, flowers, shrubs, orchards, and trees.

It is a further object of the present invention to provide a sprinkler assembly that is foldable into a portable configuration for easy carrying and storage by the user without removing any bolts or nuts.

SUMMARY OF THE INVENTION

A lawn sprinkler assembly according to the present invention includes a single length of suitable piping having two open ends to which a shut-off valve and a sprinkler are attached. To easily maneuver the sprinkler assembly, the sprinkler assembly includes a wheel assembly which wheel assembly can be collapsed for easy storage of the sprinkler assembly.

The sprinkler assembly also contains a support assembly which allows the sprinkler assembly to be maintained above ground level so as to avoid the need for the user to bend over and lift the piping when moving the sprinkler assembly. The rod assembly can also be easily collapsed for easy storage of the sprinkler assembly.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

The present invention and the various features and advantageous details thereof are explained more fully with reference to the non-limiting embodiments described in the following description.

FIGS. 1 through 16 show a device of the present invention which can be used for easily watering a lawn, garden, riding arena, flower bed and the like. The sprinkler assembly 20 is comprised of a section of suitable piping 22, a wheel assembly, a support assembly 56 and a pair of lock assemblies 68.

Figure 1:
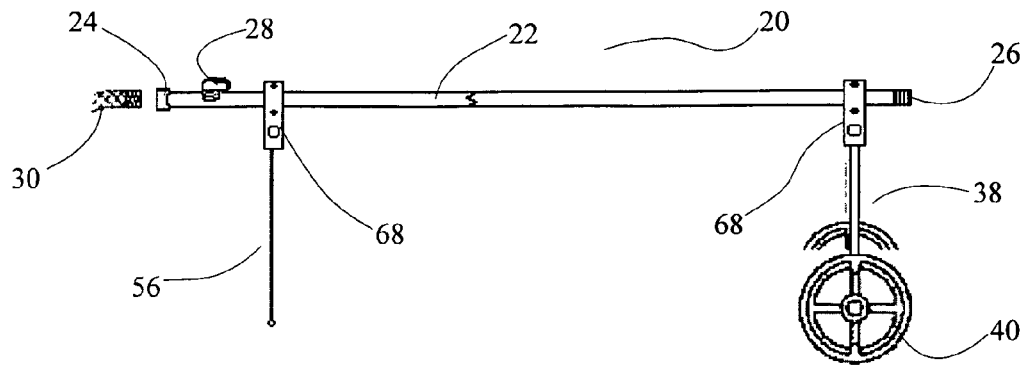
FIG. 1 is a side perspective view of the sprinkler assembly in accordance with the preferred embodiments of the present invention.
Figure 2:
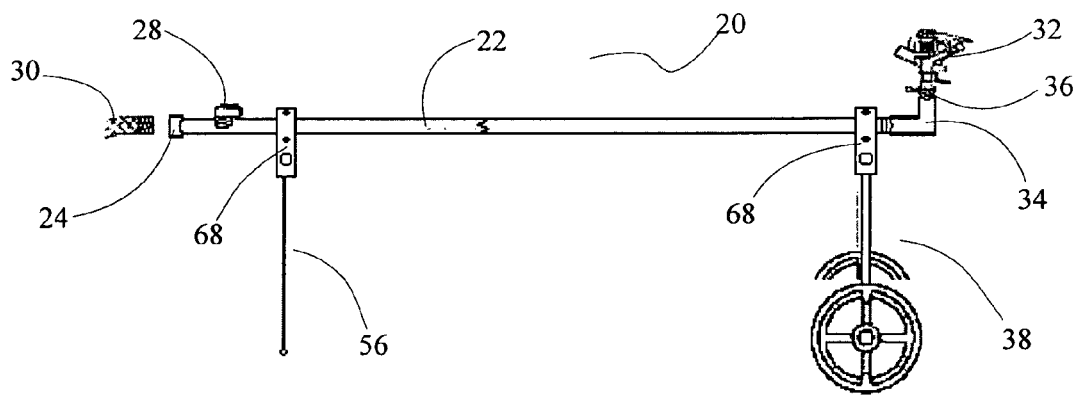
FIG. 2 is a side perspective view of the sprinkler assembly with an attached sprinkler head in accordance with the preferred embodiments of the present invention.
Figure 3:
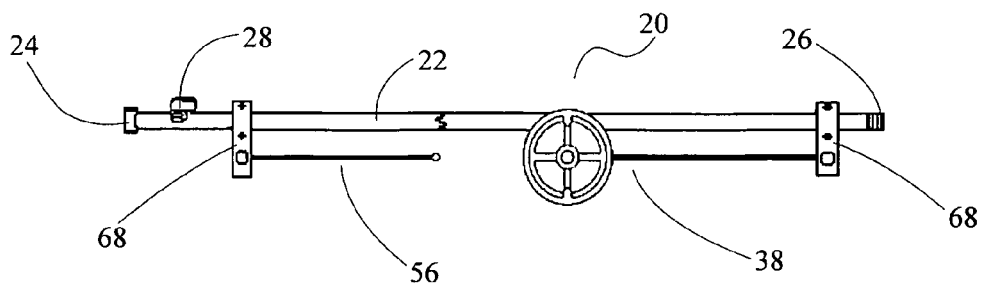
FIG. 3 is a side perspective view of the sprinkler assembly in a folded position in accordance with the preferred embodiments of the present invention.
Figure 4:
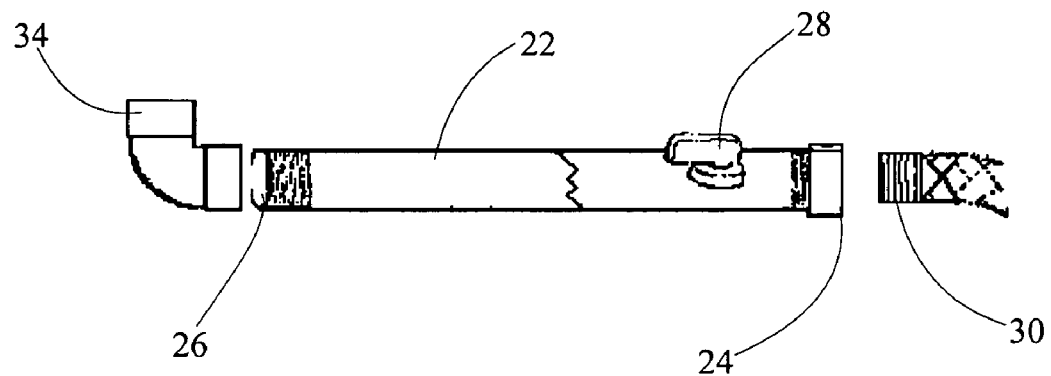
FIG. 4 is a side perspective view of the sprinkler assembly's shut-off valve and supply hose in accordance with the preferred embodiments of the present invention.
Figure 5:
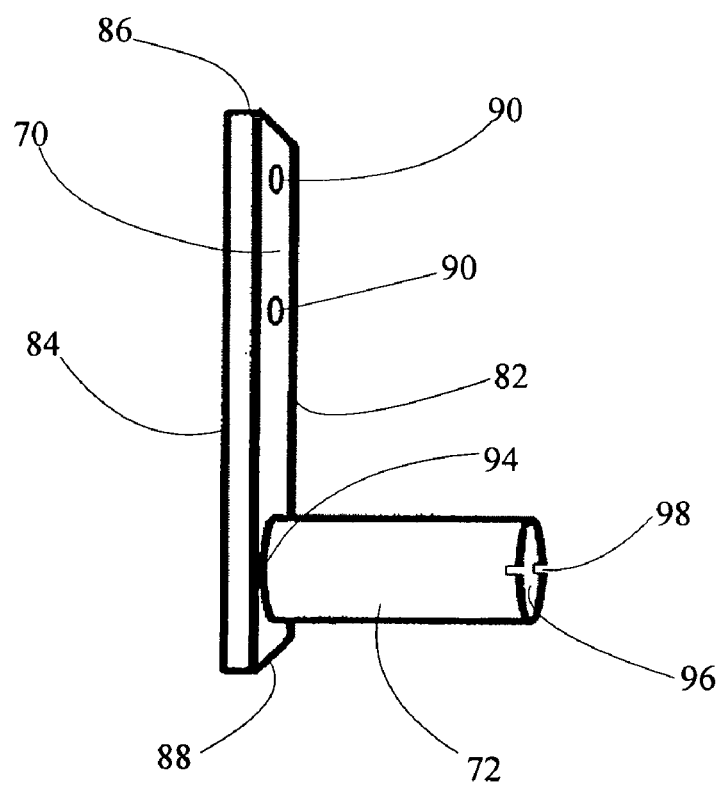
FIG. 5 is a side perspective view of the plate and tubular receiver of the lock assembly in accordance with the preferred embodiments of the present invention.
Figure 6:
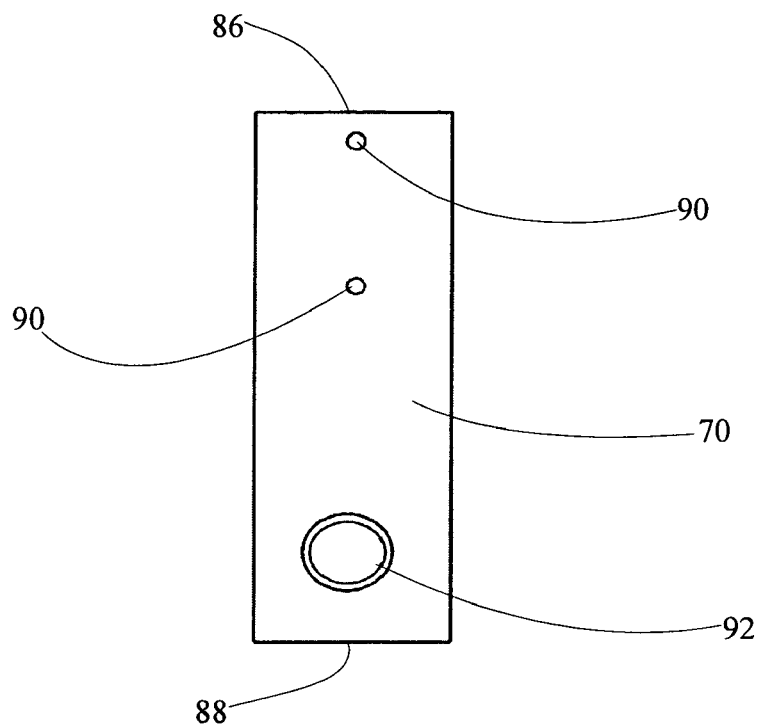
FIG. 6 is a front perspective view of the plate of the lock assembly in accordance with the preferred embodiments of the present invention.
Figure 7:
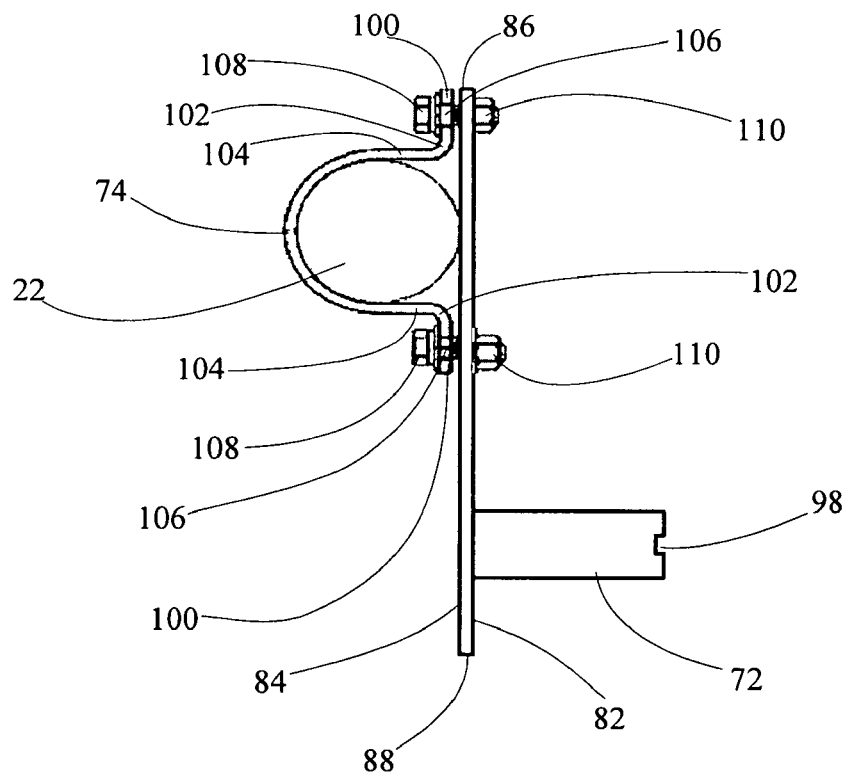
FIG. 7 is a side perspective view of the clamp, plate and tubular receiver of the lock assembly in accordance with the preferred embodiments of the present invention.

Referring to FIGS. 1, 2 and 3, the sprinkler assembly 20 consists of a single length of suitable piping 22 having a first open end 24 and a second open end 26. Adjacent to the first open end 24 is a shut-off valve 28 which allows the user to turn off the water flowing into the piping 22. The first open end 24 of the piping 22 is female threaded. The male end of a supply hose 30 is removable attached to the female threads of the first open end 24 of the piping 22.

The second open end 26 of the piping 22 is a threaded male end. In the preferred embodiment, the female end of a sprinkler 32 is removably attached to the male threaded second open end 26. In an alternative embodiment, the first female end of a ninety-degree elbow fitting 34 is removably attached to the male threaded second open end 26. The male threaded end of a sprinkler head 36 is removably attached to the second female end of the ninety-degree elbow fitting 34.

In an alternative embodiment of the present invention, multiple sprinklers can be utilized by attaching the female end of a "T" connector (not shown) to the male threaded second open end 26 of the piping 22. The first ends of extension pipes (not shown) can then be removably attached to the open ends of the "T" connector with sprinklers attached to the second ends of the extension pipes.

Figure 13:
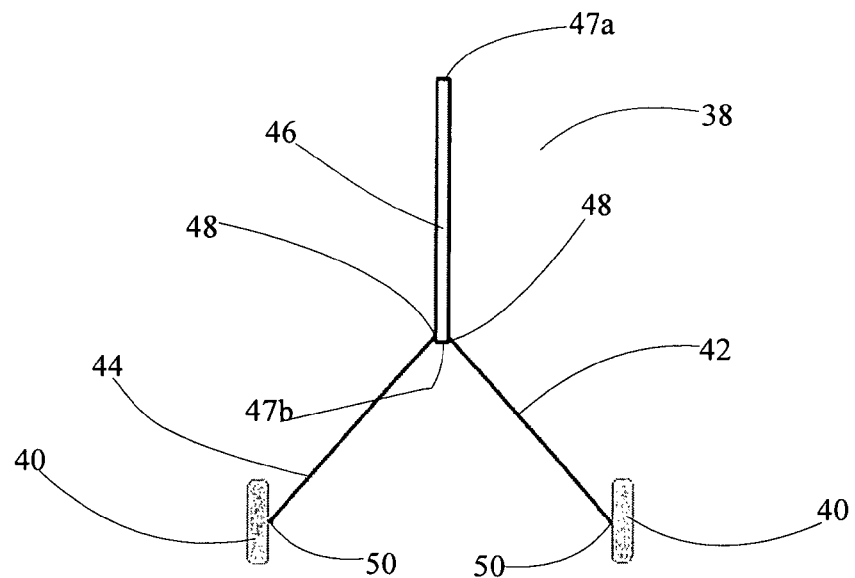
FIG. 13 is a front perspective view of the wheel assembly in accordance with the preferred embodiments of the present invention.
Figure 14:
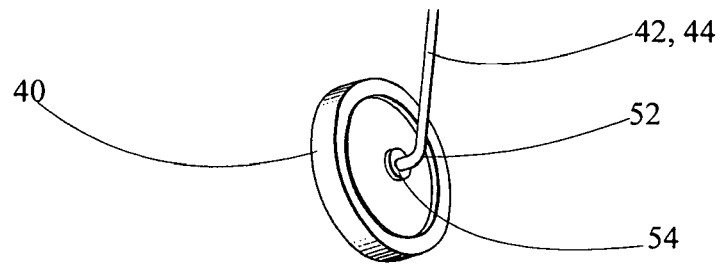
FIG. 14 is a front perspective view of a wheel and wheel arm in accordance with the preferred embodiments of the present invention.
Figure 15:
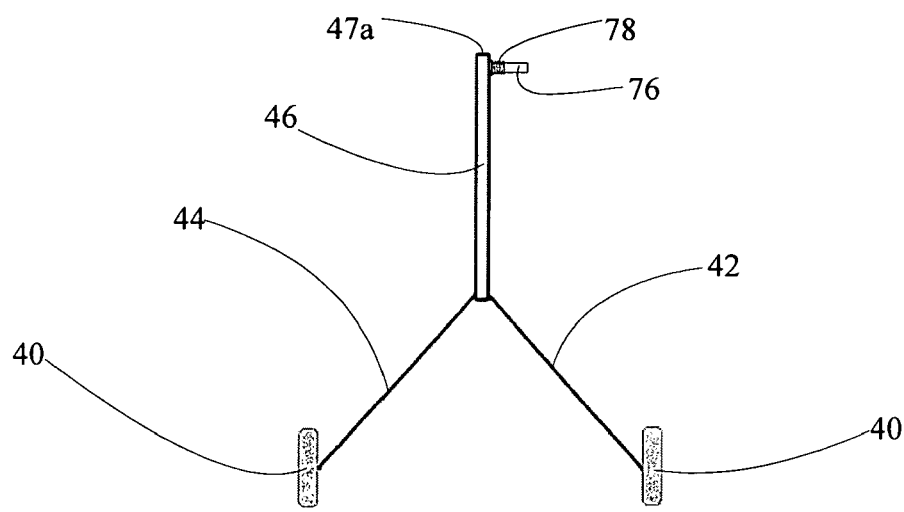
FIG. 15 is a front perspective view of the wheel assembly with the attached tubular insert in accordance with the preferred embodiments of the present invention.

Referring to FIGS. 13, 14 and 15, to easily move the sprinkler assembly 20 from point to point, a wheel assembly 38 is incorporated into the preferred embodiment. The wheel assembly 38 is comprised of a pair of wheels 40, a first wheel arm 42, a second wheel arm 44, and a wheel assembly extension tube 46. Each wheel arm 42, 44 has a first arm end 48 and a second arm end 50 with the first arm ends 48 fixedly attached to the second end 47b of the extension tube 46. A portion of each second arm end 50 is bent 52 at an angle to the remaining portion of the second arm end 50. Each of the bent portions 52 of the arms 42, 44 is so bent that when each of the arms 42, 44 is fastened to the extension tube 46, the bent portions of each of the arms 42, 44 are coaxial, and form axles 54. Each wheel 40 is held rotatably secured to the axle 54 by means of a suitable quick-acting lock mechanism (not shown) which is easily released when the wheels 40 are to be removed.

Figure 16:
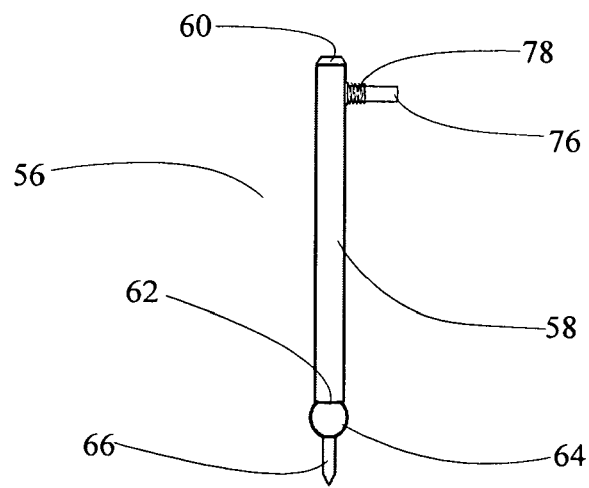
FIG. 16 is a front perspective view of the support assembly in accordance with the preferred embodiments of the present invention.

To maintain the sprinkler assembly 20 in a horizontal position so the user can attach or detach the supply hose 30, adjust the shut-off valve 28 or move the sprinkler assembly 20 without having to bend over, a support assembly 56 is provided. Referring to FIG. 16, the support assembly 56 is comprised of a support assembly extension tube 58 having a first end 60 and a second end 62. Fixedly attached to the extension tube's 58 second end 62 is an "O" shaped hook 64. Attached to the hook 64 is a spike 66 which spike 66 can be pushed into the ground surface to maintain the sprinkler assembly 20 in its desired position.

Both the wheel assembly 38 and the support assembly 56 are rotatably maintained on the sprinkler pipe 22 through a pair of lock assemblies 68. Referring to FIGS. 5 through 12, each lock assembly 68 is comprised of a plate 70, a tubular receiver 72, a clamp 74, a tubular insert 76, a spring 78, and a pin 80. The plate 70 is rectangular shaped having a front side 82, a back side 84, a top end 86 and a bottom end 88. Below the top end 86 are a pair of vertically spaced small diameter cylindrical openings 90. Above the bottom end 88 is a large diameter cylindrical opening 92.

The first open end 94 of the tubular receiver 72 is fixedly attached over the large diameter cylindrical opening 92 so that the second open end 96 of the tubular receiver 72 is at a right angle to the plate 70. The second open end 96 of the tubular receiver 72 contains a plurality of notches 98.

The clamp 74, which is mountable to the plate 70, is preferably "U" shaped which defines a diameter substantially equal to or greater than the diameter of the pipe 22 to be retained therein. In the preferred embodiment of the present invention, the clamp 74 has outwardly extending flanges 100 attached to the ends 102 of the generally horizontal leg sections 104. The flanges 100 contain openings 106 which openings 106 are aligned with the small diameter openings 90 of the plate 70. A bolt 108 is interested into the aligned openings 90, 106 and maintained in place with a nut 110 so the clamp 74 and plate 70 are removably attached.

Figure 8:
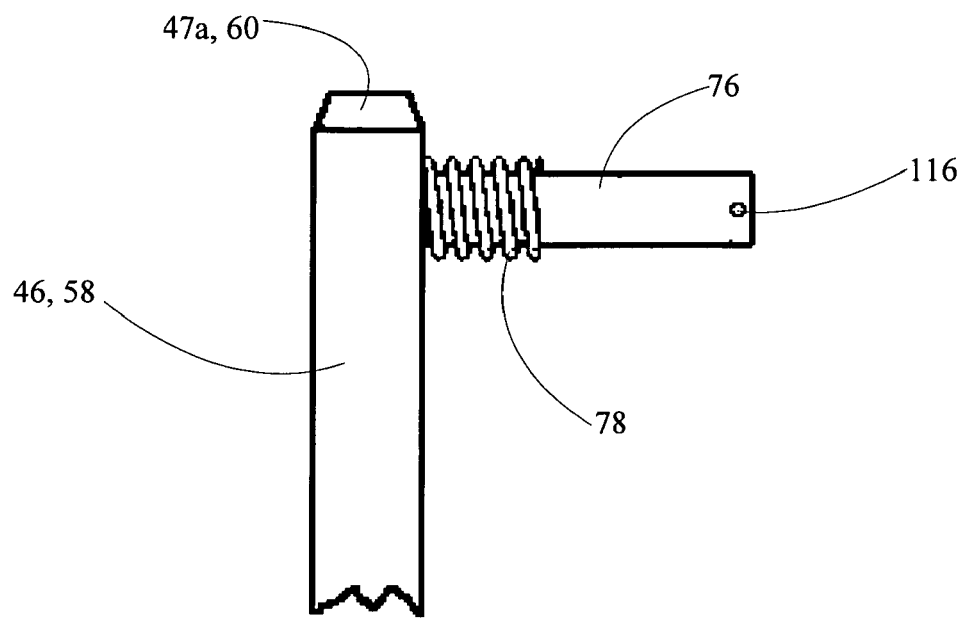
FIG. 8 is a side perspective view of the square tubing and the lock assembly's spring and tubular insert in accordance with the preferred embodiments of the present invention.
Figure 9:
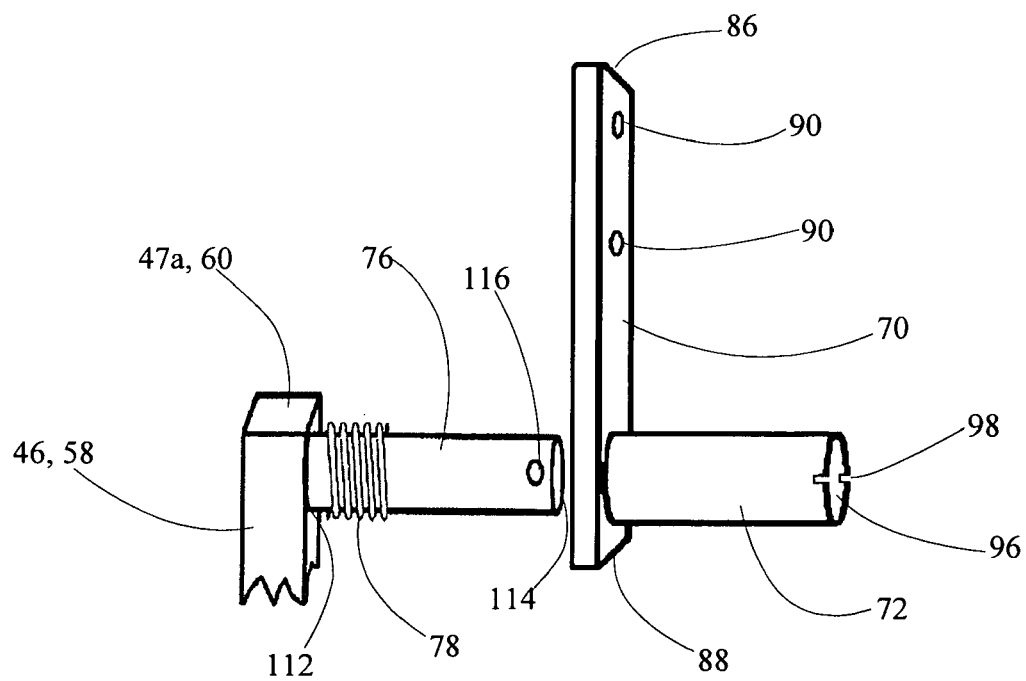
FIG. 9 is a side perspective view of the lock assembly in accordance with the preferred embodiments of the present invention.
Figure 10:
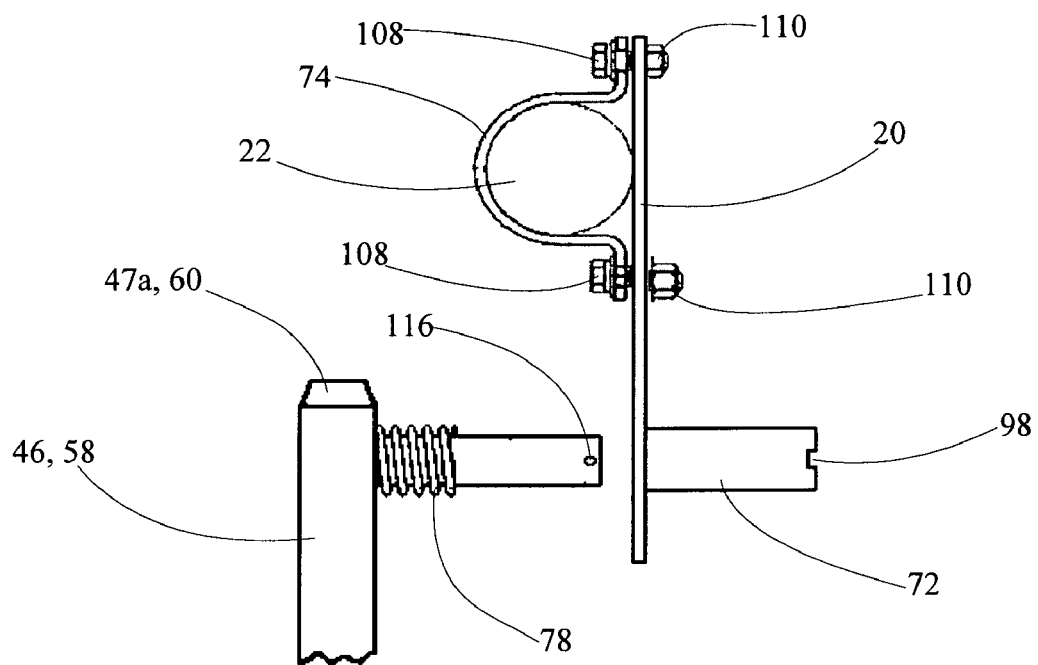
FIG. 10 is a side perspective view of the lock assembly in accordance with the preferred embodiments of the present invention.
Figure 11:
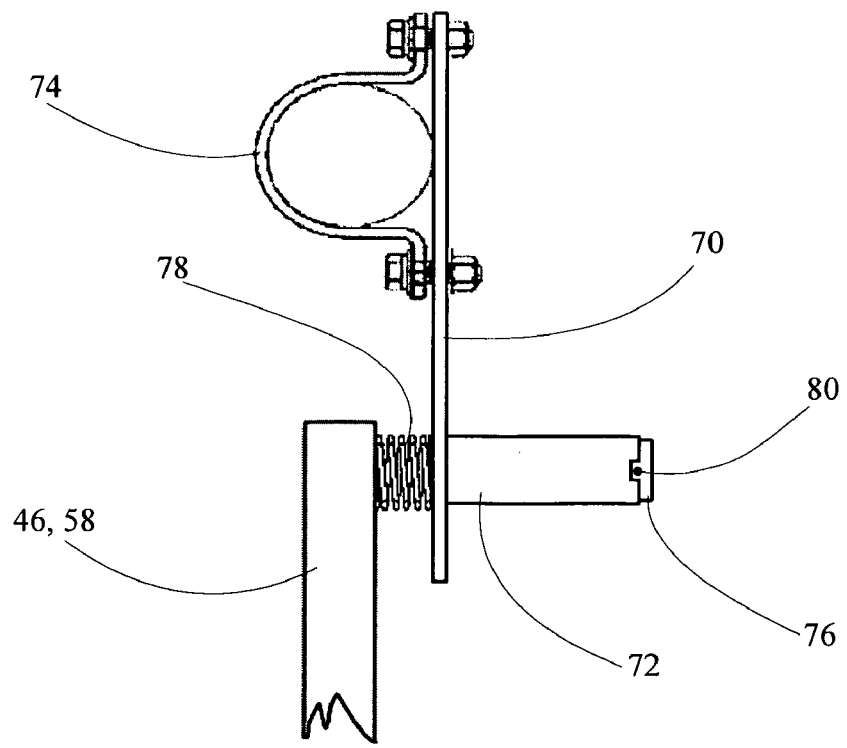
FIG. 11 is a side perspective view of the lock assembly with the square tubing in a vertical position in accordance with the preferred embodiments of the present invention.
Figure 12:
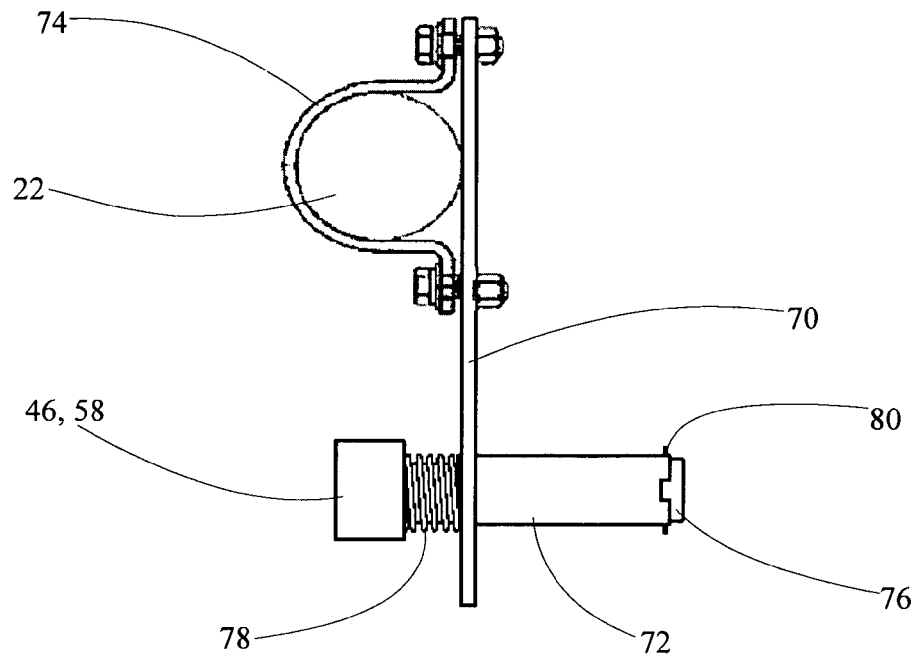
FIG. 12 is a side perspective view of the lock assembly with the square tubing in a horizontal position in accordance with the preferred embodiments of the present invention.

Referring to FIGS. 8, 15, 16, fixedly attached near the first ends 47a, 62 of the extension tubes 46, 58 is the first end 112 of a tubular insert 76. The tubular insert 76 is at a right angle to the extension tubes 46, 58. The diameter of the tubular insert 76 is slightly less than the diameter of the tubular receiver 72 so as to allow the tubular insert 76 to be rotatable within the tubular receiver 72. Near the second end 114 of the tubular insert 76 is a cylindrical opening 116. Maintained on the tubular insert 76 is a spring 78.

The tubular insert 76 is rotatably inserted into the tubular receiver 72 with the plate 70 and extension tube 46, 58 pressed together so that the second end 114 of the tubular insert 72 extends beyond the second end 96 of the tubular receiver 72 and a pin 80 inserted into the cylindrical opening 116 of the tubular insert 76. Releasing the plate 70 and extension tube 46, 58 causes the spring 78 to pull the extension tube 46, 58 away from the plate 70. The pin 80, removably attached to the tubular insert 76, is pulled into the notches 98 of the tubular receiver 72 thereby resulting in the tubular insert 76 being maintained within the tubular receiver 72.

To collapse or otherwise adjust the wheel assembly 38 and/or support assembly 56, a user need simply press the extension tube 46, 58 and plate 70 together resulting in the pin 80 being dislodged from the notches 98. With the pin 80 dislodged, the tubular insert 76 can be freely rotated within the tubular receiver 72. Once the desired position of the wheel assembly 38 and/or support assembly 56 has been achieved, the user can release the extension tube 46, 58 and plate 70 causing the pin 80 to become lodged within the notches 98 corresponding with the position desired.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept.

The individual components mentioned herein need not be fabricated from the disclosed materials, but could be fabricated from virtually any suitable and strong materials.

Moreover, the individual components need not be formed in the disclosed shapes, or assembled in the disclosed configuration, but could be provided in virtually any shape, and assembled in virtually any suitable configuration. It is intended that the appended claims cover all such additions, modifications and rearrangements.

What is claimed is:

1. A sprinkler assembly for easily watering a lawn, garden, riding arena, flower bed and the like which is comprised of:
   a section of pipe having a first open female end and a second open male end having a shut-off valve adjacent to the first open female end and a sprinkler removably attached to the second open male end;
   a wheel assembly for easily moving the sprinkler assembly from location to location comprised of a pair of wheels, a first wheel arm, a second wheel arm, and a wheel assembly extension tube;
   a support assembly comprised of a support assembly extension tube having a first end and a second end with an "O" shaped hook fixedly attached to the second end and a spike fixedly attached to the "O" shaped hook;
   a pair of locking assemblies which locking assemblies are comprised of a plate, a tubular receiver, a clamp, a tubular insert, a spring, and a pin.

2. A sprinkler assembly as claimed in claim 1 in which the first and second wheel arms have a first arm end and a second arm end with the first arm ends fixedly attached to the wheel assembly extension tube and a portion of each second arm end bent at an angle to the remaining portion of the second arm end so when each of the wheels arms are attached to the wheel assembly extension tube the bent portions form axles to which wheels are rotatably secured.

3. A sprinkler assembly as claimed in claim 1 in which the support assembly maintains the pipe in a horizontal position so the user can attach or detach a supply hose, adjust the shut-off valve or move the sprinkler assembly without having to bend over.

4. A sprinkler assembly as claimed in claim 1 in which the plate is rectangular shaped having a front side, a back side, a top end and a bottom end with a pair of vertically spaced small diameter cylindrical openings below the top end a large diameter cylindrical opening above the bottom end.

5. A sprinkler assembly as claimed in claim 1 in which the tubular receiver has a first open end and a second open end with the first open end fixedly attached to the plate and the second open end containing a plurality of notches.

6. A sprinkler assembly as claimed in claim 1 in which the clamp is removably attached to the plate and is preferably "U" shaped which defines a diameter substantially equal to or greater than the diameter of the pipe to be retained therein.

7. A sprinkler assembly as claimed in claim 1 in which the locking assemblies enable the wheel assembly and support assembly to be rotated from a vertical position to a substantially horizontal position for storage.

8. A sprinkler assembly as claimed in claim 1, in which a tubular insert of the locking assembly is fixedly attached to both the wheel assembly extension tube and the support assembly extension tube with the diameter of the tubular insert slightly less than the diameter of the tubular receiver so as to allow the tubular insert to be rotatable within the tubular receiver and held within the tubular receiver by means of a pin removably attached to the tubular insert.

9. A sprinkler assembly as claimed in claim 1 in which the tubular insert is rotatably inserted into the tubular receiver with the plate and wheel assembly extension tube or plate and support assembly extension tube pressed together causing the tubular insert to extend beyond the tubular receiver allowing a pin to be inserted into the tubular insert and upon releasing the plate and extension tube the spring causes the plate and wheel assembly extension tube or the plate and support assembly extension tube to separate to the point at which the pin comes into contact with the tubular resulting in the tubular insert being rotatably maintained within the tubular receiver.

10. A sprinkler assembly for easily watering a lawn, garden, riding arena, flower bed and the like which is comprised of:
   a section of pipe having a first open female end and a second open male end having a shut-off valve adjacent to the first open female end and a sprinkler removably attached to the second open male end;
   a wheel assembly for easily moving the sprinkler assembly from location to location comprised of a pair of wheels, a first wheel arm, a second wheel arm, and a wheel assembly extension tube having a first end and a second end with the first and second wheel arms having a first arm end and a second arm end with the first arm ends fixedly attached to the second end of the wheel assembly extension tube and a portion of each second arm end bent at an angle to the remaining portion of the second arm end so when each of the wheel arms are attached to the wheel assembly extension tube the bent portions form axles to which wheels are rotatably secured;
   a support assembly for maintaining the pipe in a horizontal position so the user can attach or detach a supply hose, adjust the shut-off valve or move the sprinkler assembly without having to bend over which support assembly is comprised of a support assembly extension tube having a first end and a second end with an "O" shaped hook fixedly attached to the second end for hanging the sprinkler assembly when collapsed and a spike fixedly attached to the "O" shaped hook which spike can be temporarily embedded into the surface for maintaining the sprinkler assembly in a fixed position; and
   a pair of locking assemblies for rotating and maintaining the wheel assembly and support assembly in their desired positions which locking assemblies are comprised of a plate which plate is rectangular shaped having a front side, a back side, a top end and a bottom end with a pair of vertically spaced small diameter cylindrical openings below the top end and a large diameter cylindrical opening above the bottom end;

a tubular receiver having a first open end and a second open end with said first open end fixedly attached about the large diameter cylindrical opening of the plate and the second open end of said tubular receiver containing a plurality of notches;

a clamp for securing the pipe to the plate with said clamp having a U-shaped body for retaining the pipe therein, said U-shaped body having a semi-circular portion, ending in two straight portions having opposed outwardly extending feet which feet have cylindrical openings which are aligned with the small cylindrical openings of the plate;

a tubular insert having a first end and a second end with the said first end fixedly attached near the first ends of the wheel assembly extension tube and the support assembly extension tube and the second end having a cylindrical opening;

a spring which spring is movably maintained about the tubular insert; and a pin removably maintained within the cylindrical opening of the tubular insert.

11. A sprinkler assembly as claimed in claim 10 in which the diameter of the tubular insert is slightly less than the diameter of the tubular receiver so as to allow the tubular insert to be rotatable within the tubular receiver.

12. A sprinkler assembly as claimed in claim 10 in which the tubular insert is inserted into the tubular receiver with the plate and wheel assembly extension tube or plate and support assembly extension tube pressed together, thereby compressing the spring, so that the second end of the tubular insert extends beyond the second end of the tubular receiver allowing the pin to be inserted into the cylindrical opening of the tubular insert and upon releasing the plate and wheel assembly extension tube or the plate and support assembly extension tube the spring expands causing the pin to be pulled into the notches of the tubular receiver and held in such a position.

13. A sprinkler assembly as claimed in claim 10 in which the locking assemblies enable the wheel assembly and support assembly to be rotated from a vertical position to a substantially horizontal position for storage.

14. A sprinkler assembly as claimed in claim 10 in which both the wheel assembly and the support assembly are rotatably maintained on the sprinkler pipe through the locking assemblies.

* * * * *